United States Patent
Kim et al.

(10) Patent No.: US 10,504,027 B1
(45) Date of Patent: Dec. 10, 2019

(54) CNN-BASED LEARNING METHOD, LEARNING DEVICE FOR SELECTING USEFUL TRAINING DATA AND TEST METHOD, TEST DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/171,755

(22) Filed: Oct. 26, 2018

(51) Int. Cl.
*G06N 5/04* (2006.01)
*G06N 3/08* (2006.01)
*G06K 9/38* (2006.01)
*G06K 9/78* (2006.01)
*G06K 9/62* (2006.01)

(52) U.S. Cl.
CPC ............ *G06N 5/046* (2013.01); *G06K 9/38* (2013.01); *G06K 9/6256* (2013.01); *G06K 9/78* (2013.01); *G06N 3/084* (2013.01)

(58) Field of Classification Search
CPC .......... G06N 5/046; G06N 3/084; G06K 9/38; G06K 9/6256; G06K 9/78
See application file for complete search history.

(56) References Cited

U.S. PATENT DOCUMENTS 9,665,799 B1 * 5/2017 Munteanu ................ G06T 1/20
2018/0300855 A1 * 10/2018 Tang ..................... G06T 3/4053
(Continued)

OTHER PUBLICATIONS

Fukui, Hiroshi, et al. "Pedestrian detection based on deep convolutional neural network with ensemble inference network." 2015 IEEE Intelligent Vehicles Symposium (IV). IEEE, 2015. (Year: 2015).*

(Continued)

*Primary Examiner* — Eric Nilsson
(74) *Attorney, Agent, or Firm* — Xsensus LLP

(57) ABSTRACT

A convolutional neural network (CNN)-based learning method for selecting useful training data is provided. The CNN-based learning method includes steps of: a learning device (a) instructing a first CNN module (i) to generate a first feature map, and instructing a second CNN module to generate a second feature map; (ii) to generate a first output indicating identification information or location information of an object by using the first feature map, and calculate a first loss by referring to the first output and its corresponding GT; (b) instructing the second CNN module (i) to change a size of the first feature map and integrate the first feature map with the second feature map, to generate a third feature map; (ii) to generate a fourth feature map and to calculate a second loss; and (c) backpropagating the auto-screener's loss generated by referring to the first loss and the second loss.

30 Claims, 6 Drawing Sheets

(56) References Cited

U.S. PATENT DOCUMENTS

2019/0050682 A1* 2/2019 Sutic .................... G06K 9/6256
2019/0164290 A1* 5/2019 Wang ........................ G06T 7/10

OTHER PUBLICATIONS

Cai, Zhaowei, et al. "A unified multi-scale deep convolutional neural network for fast object detection." European conference on computer vision. Springer, Cham, 2016. (Year: 2016).*

Li, Guanbin, and Yizhou Yu. "Deep contrast learning for salient object detection." Proceedings of the IEEE Conference on Computer Vision and Pattern Recognition. 2016. (Year: 2016).*

* cited by examiner

US 10,504,027 B1

CNN-BASED LEARNING METHOD, LEARNING DEVICE FOR SELECTING USEFUL TRAINING DATA AND TEST METHOD, TEST DEVICE USING THE SAME

FIELD OF THE INVENTION

The present invention relates to a convolutional neural network (CNN)-based learning method; and more particularly, to the learning method for selecting useful training data, including steps of: (a) a learning device, if at least one input image is acquired, (i) instructing a first CNN module capable of obtaining identification information or location information of a specific object in the input image to apply at least one convolution operation to the input image, to thereby generate a first feature map, and (ii) instructing a second CNN module capable of auto-screening useful training data to be used for a learning process of the first CNN module to apply at least one convolution operation to the input image, to thereby generate a second feature map; (b) the learning device instructing the first CNN module to generate a first output indicating the identification information or the location information of the specific object by using the first feature map, then calculate a first loss by referring to the first output and its corresponding ground truth (GT); (c) the learning device inputting the first feature map to the second CNN module, then instructing the second CNN module to change a size of the first feature map to be same as a size of the second feature map and then integrate the first feature map with the second feature map, to thereby generate a third feature map; (d) the learning device instructing the second CNN module to apply at least one convolution operation to the third feature map to generate a fourth feature map, and then to calculate a second loss, as a prediction value of the first loss, by using the fourth feature map; (e) the learning device calculating an auto-screener's loss by referring to the first loss and the second loss; and (f) the learning device performing backpropagation by using the auto-screener's loss, to thereby optimize at least one parameter of the second CNN module, and a learning device, a testing method, and a testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer may classify it as a dog.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 shows an example of various outputs to be acquired from a photograph using a deep CNN according to prior art.

Classification is a method for identifying a type of a class to be acquired from a photograph, for example, as shown in FIG. 1, determining whether an acquired object is a person, a lamb, or a dog. Detection is a method for finding every object and displaying the found object as enclosed in a bounding box. Segmentation is a method for distinguishing a region of a specific object from other objects in a photograph. As the deep learning has recently become popular, the classification, the detection, and the segmentation are using the deep learning heavily.

FIG. 2. is a diagram schematically illustrating a detection method by using the CNN.

By referring to FIG. 2, the learning device receives an input image and applies a plurality of convolution operations to the input image through a plurality of convolutional filters (or convolutional layers) to thereby generate at least one feature map. Then, the learning device allows the feature map to pass through a detection layer to thereby generate at least one bounding box, and then allows the bounding box to pass through the filtering layer to thereby generate a final detection result. Thereafter, backpropagation is performed by using a loss value obtained by referring to the detection result and its corresponding a ground truth (GT) value which has been annotated by a person in advance to thereby allow a detector (i.e., the learning device) to gradually make the detection result value get closer to the GT value.

Herein, the performance of the learned detector may be somewhat proportional to size(s) of database(s) for training.

Meanwhile, according to a conventional art, to create an image database for training, a person generates GTs by drawing GT boxes or by annotating classes on each of training images in the image database as shown in FIG. 3.

However, there was a problem in that the number of the training images included in the image database for training is not directly proportional to the performance of the learning device for, e.g., the detector. This is because an effective learning process is achieved only when there are many training images which include one or more objects with a low possibilities of being correctly detected by the detector. In general, as the performance of the detector becomes more enhanced during the learning process, it becomes more difficult to improve the performance of the detector by using additional training images.

For example, on condition that the performance of the detector becomes 95% through the learning process, if there are 10,000 images in the image database for training, useful images which can contribute to the performance of the detector may be only 5%, i.e., 500 images, of the 10,000 images. If the number of the training images in the database for training is increased by 10 times, people should manually generate GTs for 90,000 images, which requires a lot of costs for establishing such a database, but only about 4,500 images would be useful for the improvement of the performance of the detector. Furthermore, if the performance of the detector becomes 98% through the learning process using the useful 4,500 images, the costs for establishing the database for the improvement of the detector rapidly increase. In this case, in order to secure useful additional 4,500 images, GTs should be prepared for more than 2,000,000 images.

SUMMARY OF THE INVENTION

It is an object of the present invention to solve all the aforementioned problems.

It is another object of the present invention to analyze weak points of a convolutional neural network (CNN)-based learning device to thereby provide a method for automatically selecting appropriate training data, which is necessary for the improvement of the performance of the learning device.

It is still another object of the present invention to reduce costs for establishing a database for training, which is used for the improvement of the performance of the learning device.

In accordance with one aspect of the present invention, there is provided a convolutional neural network (CNN)-based learning method for selecting useful training data, including steps of: (a) a learning device, if at least one input image is acquired, (i) instructing a first CNN module capable of obtaining identification information or location information of a specific object in the input image to apply at least one convolution operation to the input image, to thereby generate a first feature map, and (ii) instructing a second CNN module capable of auto-screening useful training data to be used for a learning process of the first CNN module to apply at least one convolution operation to the input image, to thereby generate a second feature map; (b) the learning device instructing the first CNN module to generate a first output indicating the identification information or the location information of the specific object by using the first feature map, then calculate a first loss by referring to the first output and its corresponding ground truth (GT); (c) the learning device inputting the first feature map to the second CNN module, then instructing the second CNN module to change a size of the first feature map to be same as a size of the second feature map and then integrate the first feature map with the second feature map, to thereby generate a third feature map; (d) the learning device instructing the second CNN module to apply at least one convolution operation to the third feature map to generate a fourth feature map, and then to calculate a second loss, as a prediction value of the first loss, by using the fourth feature map; (e) the learning device calculating an auto-screener's loss by referring to the first loss and the second loss; and (f) the learning device performing backpropagation by using the auto-screener's loss, to thereby optimize at least one parameter of the second CNN module.

As one example, at the step of (f), the learning device performs backpropagation by using the first loss, to thereby optimize at least one parameter of the first CNN module.

As one example, the first CNN module is included in one of an object detection system for detecting a size and a location of the specific object, a classification system for identifying a type of the specific object, and a segmentation system for distinguishing an area corresponding to the specific object from other areas, wherein the second CNN module is included in an auto-screening system for automatically selecting at least one specific input image, which respectively includes its corresponding specific object with a low possibility of being correctly detected, among a plurality of input images inputted to the first CNN module, wherein the first output represents one of an output of the object detection system, that of the classification system, and that of the segmentation system, and wherein the low possibility of being correctly detected is determined by referring to information on whether a possibility is less than a predetermined threshold.

As one example, the size of the second feature map is greater than the size of the first feature map, wherein, at the step of (c), the learning device instructs the second CNN module to increase the size of the first feature map to be same as the size of the second feature map.

As one example, at the step of (c), the learning device instructs the second CNN module to apply a predetermined number of convolution operations to the first feature map, to thereby change the size of the first feature map to be same as the size of the second feature map.

As one example, at the step of (c), the learning device instructs the second CNN module to concatenate the first feature map and the second feature map, to thereby generate the third feature map.

As one example, at the step of (d), the learning device instructs the second CNN module to allow the fourth feature map to pass through at least one of pooling layer and a fully-connected (FC) layer, to thereby calculate the second loss.

As one example, the pooling layer instructs a height and a width of the fourth feature map to become 1.

As one example, at the step of (f), the learning device performs backpropagation in such a manner that minimizes the auto-screener's loss.

In accordance with another aspect of the present invention, there is provided a method for selecting useful training data based on convolutional neural network (CNN), including steps of: (a) on condition that (I) a learning device (i) has instructed a first CNN module capable of obtaining identification information or location information of a specific object in a training image to apply at least one predetermined convolution operation to the training image, to thereby generate a first feature map for training, and (ii) has instructed a second CNN module capable of auto-screening useful training data to be used for a learning process of the first CNN module to apply at least one convolution operation to the training image, to thereby generate a second feature map for training; (II) the learning device has instructed the first CNN module to generate a first output for training indicating the identification information or the location information of the specific object by using the first feature map for training, then calculate a first loss by referring to the first output for training and its corresponding ground truth (GT); (III) the learning device has inputted the first feature map for training to the second CNN module, then has instructed the second CNN module to change a size of the first feature map for training to be same as a size of the second feature map for training and then integrate the first feature map for training with the second feature map for training, to thereby generate a third feature map for training; (IV) the learning device has instructed the second CNN module to apply at least one convolution operation to the third feature map for training to generate a fourth feature map for training, and then to calculate a second loss, as a prediction value of the first loss, by using the fourth feature map; (V) the learning device has calculated an auto-screener's loss by referring to the first loss and the second loss; and (VI) the learning device has performed backpropagation by using the auto-screener's loss, to thereby optimize at least one parameter of the second CNN module, a testing device obtaining each of image candidates as each test image; (b) the testing device (i) instructing the first CNN module to apply at least one convolution operation to the test image, to thereby generate a first feature map for testing, and (ii) instructing the second CNN module to apply at least one convolution operation to the test image, to thereby generate a second feature map for testing; (c) the testing device inputting the first feature map for testing to the second CNN module, then instructing the second CNN module to change a size of the first feature map for testing to be same as a size of the second feature map for testing and then integrating the first feature map for testing with the second feature map for testing, to thereby generate a third feature map for testing; (d) the testing device instructing the second CNN module to apply at least one convolution operation to the third feature map for testing to generate fourth feature map for testing, and then to calculate a predicted loss by using the fourth feature map for testing; and (e) the testing device selecting at least one image of which the predicted loss is equal to or greater than a predetermined threshold, among the image candidates, as training images to be used for a learning process of the first CNN module.

As one example, the first CNN module is included in one of an object detection system for detecting a size and a location of the specific object, a classification system for identifying a type of the specific object, and a segmentation system for distinguishing an area corresponding to the specific object from other areas, wherein the second CNN module included in an auto-screening system for automatically selecting the training image, which respectively includes its corresponding specific object with a low possibility of being correctly detected, among a plurality of training images inputted to the first CNN module, wherein the first output to training represents one of an output of the object detection system, that of the classification system, and that of the segmentation system, and wherein the low possibility of being correctly detected is determined by referring to information on whether a possibility is less than a predetermined threshold.

As one example, the size of the second feature map for training is greater than the size of the first feature map for training, wherein, at the process of (III), the learning device instructs the second CNN module to increase the size of the first feature map for training to be same as the size of the second feature map for training, wherein the size of the second feature map for testing is greater than the size of the first feature map for testing, and wherein, at the step of (c), the testing device instructs the second CNN module to increase the size of the first feature map for testing to be same as the size of the second feature map for testing.

As one example, at the process of (III), the learning device instructs the second CNN module to apply a predetermined number of convolution operations to the first feature map for training, to thereby change the size of the first feature map for training to be same as the size of the second feature map for training, wherein, at the step of (c), the testing device instructs the second CNN module to apply a predetermined number of convolution operations to the first feature map for testing, to thereby change the size of the first feature map for testing to be same as the size of the second feature map for testing.

As one example, at the process of (III), the learning device instructs the second CNN module to concatenate the first feature map for training and the second feature map for training, to thereby generate the third feature map for training, wherein, at the step of (c), the testing device instructs the second CNN module to concatenate the first feature map for testing and the second feature map for testing, to thereby generate the third feature map for testing.

As one example, at the process of (IV), the learning device instructs the second CNN module to allow the fourth feature map for training to pass through at least one of a pooling layer and a fully-connected (FC) layer, to thereby calculate the second loss, wherein, at the step of (d), the testing device instructs the second CNN module to allow the fourth feature map for testing to pass through at least one of a pooling layer and a fully-connected (FC) layer, to thereby calculate the predicted loss.

In accordance with still another aspect of the present invention, there is provided a learning device for selecting useful training data, including: a communication part for acquiring at least one input image; and a processor for performing processes of (I) (I-1) instructing a first CNN module capable of obtaining identification information or location information of a specific object in the input image to apply at least one convolution operation to the input image, to thereby generate a first feature map, and (I-2) instructing a second CNN module capable of auto-screening useful training data to be used for a learning process of the first CNN module to apply at least one convolution operation to the input image, to thereby generate a second feature map, (II) instructing the first CNN module to generate a first output indicating the identification information or the location information of the specific object by using the first feature map, then calculate a first loss by referring to the first output and its corresponding ground truth (GT), (III) inputting the first feature map to the second CNN module, then instructing the second CNN module to change a size of the first feature map to be same as a size of the second feature map and then integrate the first feature map with the second feature map, to thereby generate a third feature map, (IV) instructing the second CNN module to apply at least one convolution operation to the third feature map to generate a fourth feature map, and then to calculate a second loss, as a prediction value of the first loss, by using the fourth feature map, (V) calculating an auto-screener's loss by referring to the first loss and the second loss, and (VI) performing backpropagation by using the auto-screener's loss, to thereby optimize at least one parameter of the second CNN module.

As one example, at the process of (VI), the processor performs backpropagation by using the first loss, to thereby optimize at least one parameter of the first CNN module.

As one example, the first CNN module is included in one of an object detection system for detecting a size and a location of the specific object, a classification system for identifying a type of the specific object, and a segmentation system for distinguishing an area corresponding to the specific object from other areas, wherein the second CNN module is included in an auto-screening system for automatically selecting at least one specific input image, which respectively includes its corresponding specific object with a low possibility of being correctly detected, among a plurality of input images inputted to the first CNN module, wherein the first output represents one of an output of the object detection system, that of the classification system, and that of the segmentation system, and wherein the low possibility of being correctly detected is determined by referring to information on whether a possibility is less than a predetermined threshold.

As one example, the size of the second feature map is greater than the size of the first. feature map, wherein, at the process of (III), the processor instructs the second CNN module to increase the size of the first feature map to be same as the size of the second feature map.

As one example, at the process of (III), the processor instructs the second CNN module to apply a predetermined number of convolution operations to the first feature map, to thereby change the size of the first feature map to be same as the size of the second feature map.

As one example, at the process of (III), the processor instructs the second CNN module to concatenate the first feature map and the second feature map, to thereby generate the third feature map.

As one example, at the process of (IV), the processor instructs the second CNN module to allow the fourth feature map to pass through at least one of a pooling layer and a fully-connected (FC) layer, to thereby calculate the second loss.

As one example, the pooling layer instructs a height and a width of the fourth feature map to become 1.

As one example, at the process of (VI), the processor performs backpropagation in such a manner that minimizes the auto-screener's loss.

In accordance with still yet another aspect of the present invention, there is provided a testing device for selecting useful training data based on convolutional neural network (CNN), including: a communication part for obtaining each of image candidates as each test image, on condition that (i) a learning device (i-1) has instructed a first CNN module capable of obtaining identification information or location information of a specific object in a training image to apply at least one predetermined convolution operation to the training image, to thereby generate a first feature map for training, and (i-2) has instructed a second CNN module capable of auto-screening useful training data to be used for a learning process of the first CNN module to apply at least one convolution operation to the training image, to thereby generate a second feature map for training; (ii) the learning device has instructed the first CNN module to generate a first output for training indicating the identification information or the location information of the specific object by using the first feature map for training, then calculate a first loss by referring to the first output for training and its corresponding ground truth (GT); (iii) the learning device has inputted the first feature map for training to the second CNN module, then has instructed the second CNN module to change a size of the first feature map for training to be same as a size of the second feature map for training and then integrate the first feature map for training with the second feature map for training, to thereby generate a third feature map for training; (iv) the learning device has instructed the second CNN module to apply at least one convolution operation to the third feature map for training to generate a fourth feature map for training, and then to calculate a second loss, as a prediction value of the first loss, by using the fourth feature map; (v) the learning device has calculated an auto-screener's loss by referring to the first loss and the second loss; and (vi) the learning device has performed backpropagation by using the auto-screener's loss, to thereby optimize at least one parameter of the second CNN module; and a processor for performing processes of (I)-(I-1) instructing the first CNN module to apply at least one convolution operation to the test image, to thereby generate a first feature map for testing, and (I-2) instructing the second CNN module to apply at least one convolution operation to the test image, to thereby generate a second feature map for testing, (II) inputting the first feature map for testing to the second CNN module, then instructing the second CNN module to change a size of the first feature map for testing to be same as a size of the second feature map for testing and then integrating the first feature map for testing with the second feature map for testing, to thereby generate a third feature map for testing, (III) instructing the second CNN module to apply at least one convolution operation to the third feature map for testing to generate a fourth feature map for testing, and then to calculate a predicted loss by using the fourth feature map for testing, and (IV) selecting at least one image of which the predicted loss is equal to or greater than a predetermined threshold, among the image candidates, as training images to be used for a learning process of the first CNN module.

As one example, the first CNN module is included in one of an object detection system for detecting a size and a location of the specific object, a classification system for identifying a type of the specific object, and a segmentation system for distinguishing an area corresponding to the specific object from other areas, wherein the second CNN module is included in an auto-screening system for automatically selecting the training image, which respectively includes its corresponding specific object with a low possibility of being correctly detected, among a plurality of training images inputted to the first CNN module, wherein the first output for training represents one of an output of the object detection system, that of the classification system, and that of the segmentation system, and wherein the low possibility of being correctly detected is determined by referring to information on whether a possibility is less than a predetermined threshold.

As one example, the size of the second feature map for training is greater than the size of the first feature map for training, wherein, at the process of (iii), the learning device instructs the second CNN module to increase the size of the first feature map for training to be same as the size of the second feature map for training, wherein the size of the second feature map for testing is greater than the size of the first feature map for testing, and wherein, at the process of (II), the processor instructs the second CNN module to increase the size of the first feature map for testing to be same as the size of the second feature map for testing.

As one example, at the process of (iii), the learning device instructs the second CNN module to apply a predetermined number of convolution operations to the first feature map for training, to thereby change the size of the first feature map for training to be same as the size of the second feature map for training, wherein, at the process of (II), the processor instructs the second CNN module to apply a predetermines number of convolution operations to the first feature map for testing, to thereby change the size of the first feature map for testing to be same as the size of the second feature map for testing.

As one example, at the process of (iii), the learning device instructs the second CNN module to concatenate the first feature map for training and the second feature map for training, to thereby generate the third feature map for training, wherein, at the process of (II), the processor instructs the second CNN module to concatenate the first feature map for testing a the second feature map for testing, to thereby generate the third feature map for testing.

As one example, at. the process of (iv), the learning device instructs the second CNN module to allow the fourth feature map for training to pass through at least one of a pooling layer and a fully-connected (FC) layer, to thereby calculate the second loss, wherein, at the process of (III), the processor instructs the second CNN module to allow the fourth feature map for testing to pass through at least one of a pooling layer and a fully-connected (FC) layer, to thereby calculate the predicted loss.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
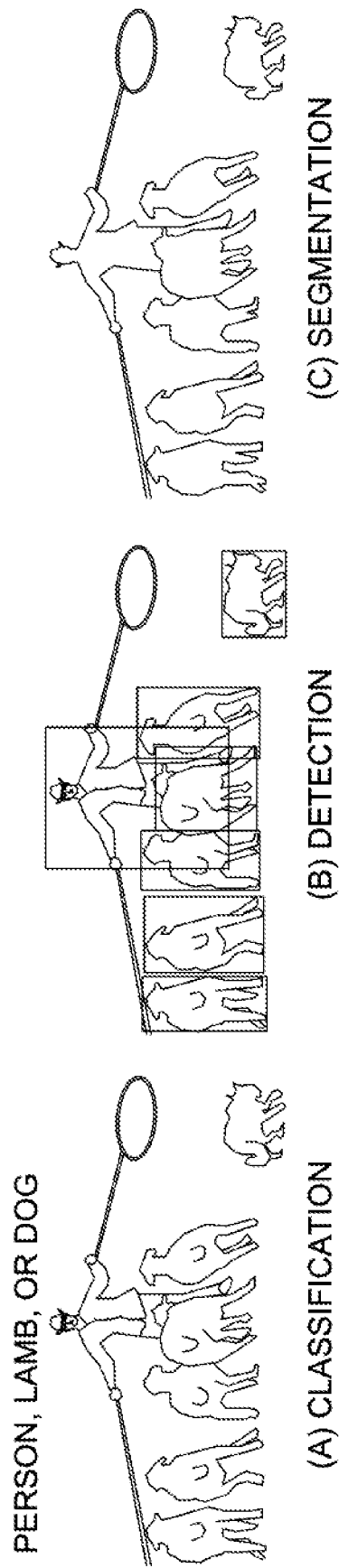
FIG. 1 illustrates examples of various outputs acquired from an image through a CNN according to a conventional art.
Figure 2:
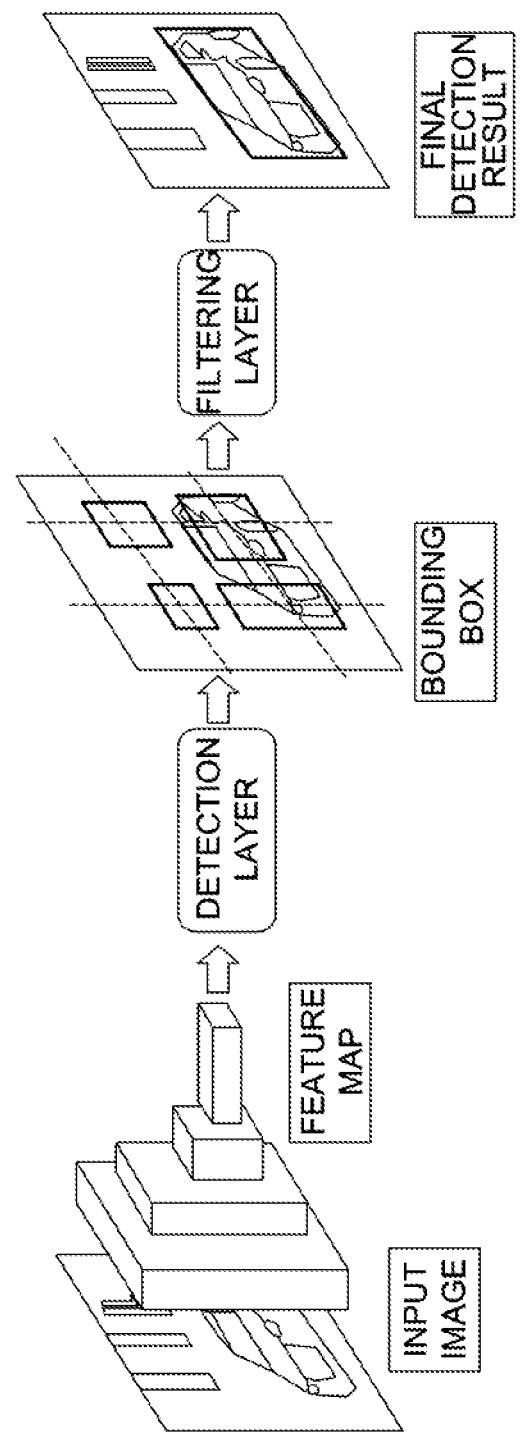
FIG. 2 is a diagram schematically illustrating a detection method by using the CNN according to a conventional art.
Figure 3:
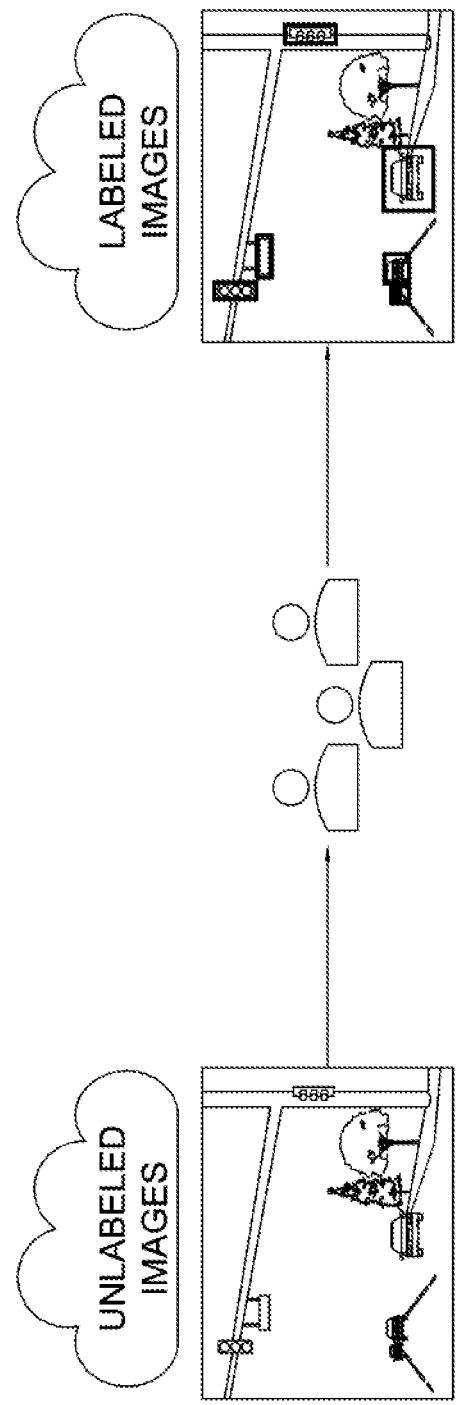
FIG. 3 is a diagram illustrating a method for establishing an image database for training according to a conventional art.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 4:
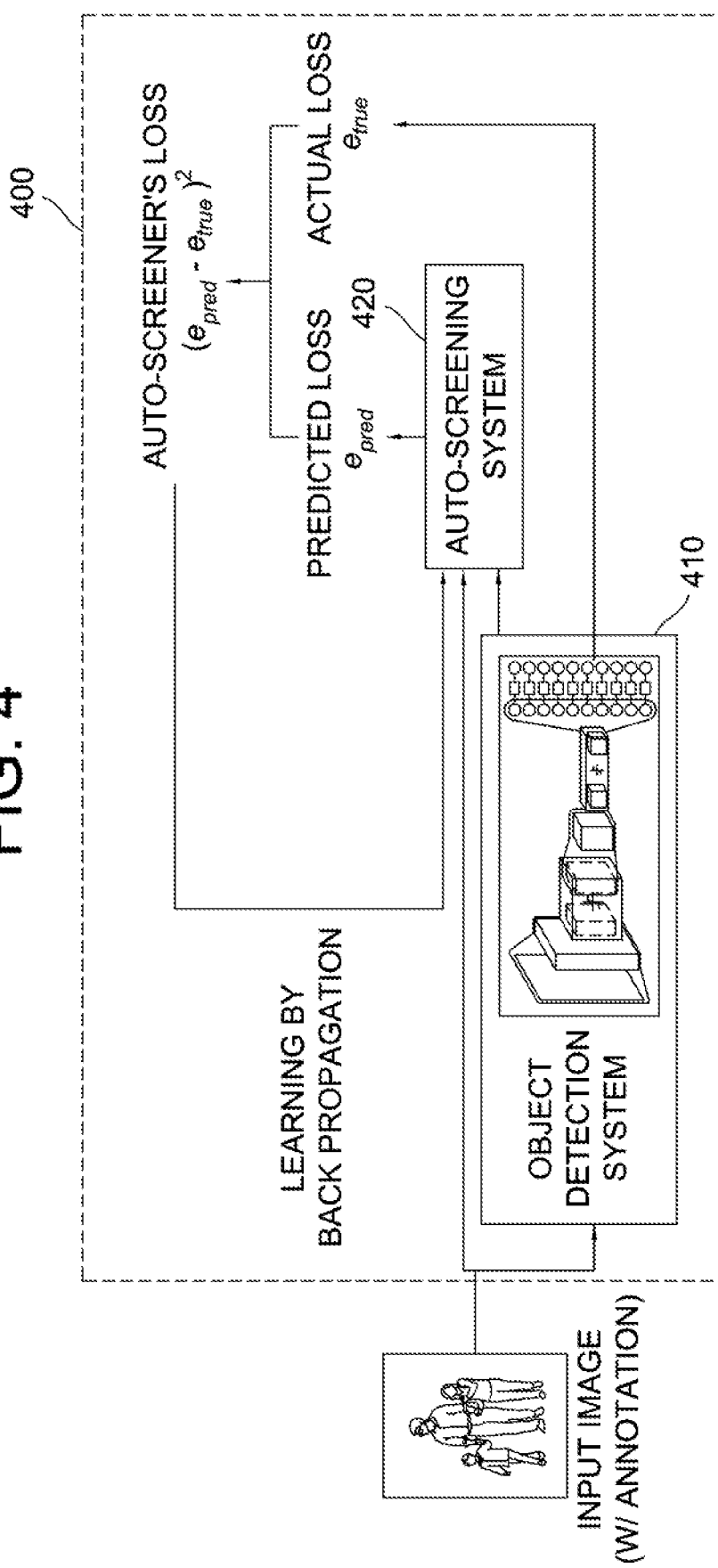
FIG. 4 is a diagram illustrating a method of learning an auto-screening system capable of selecting useful images to be used as training data in accordance with the present invention.
Figure 5:
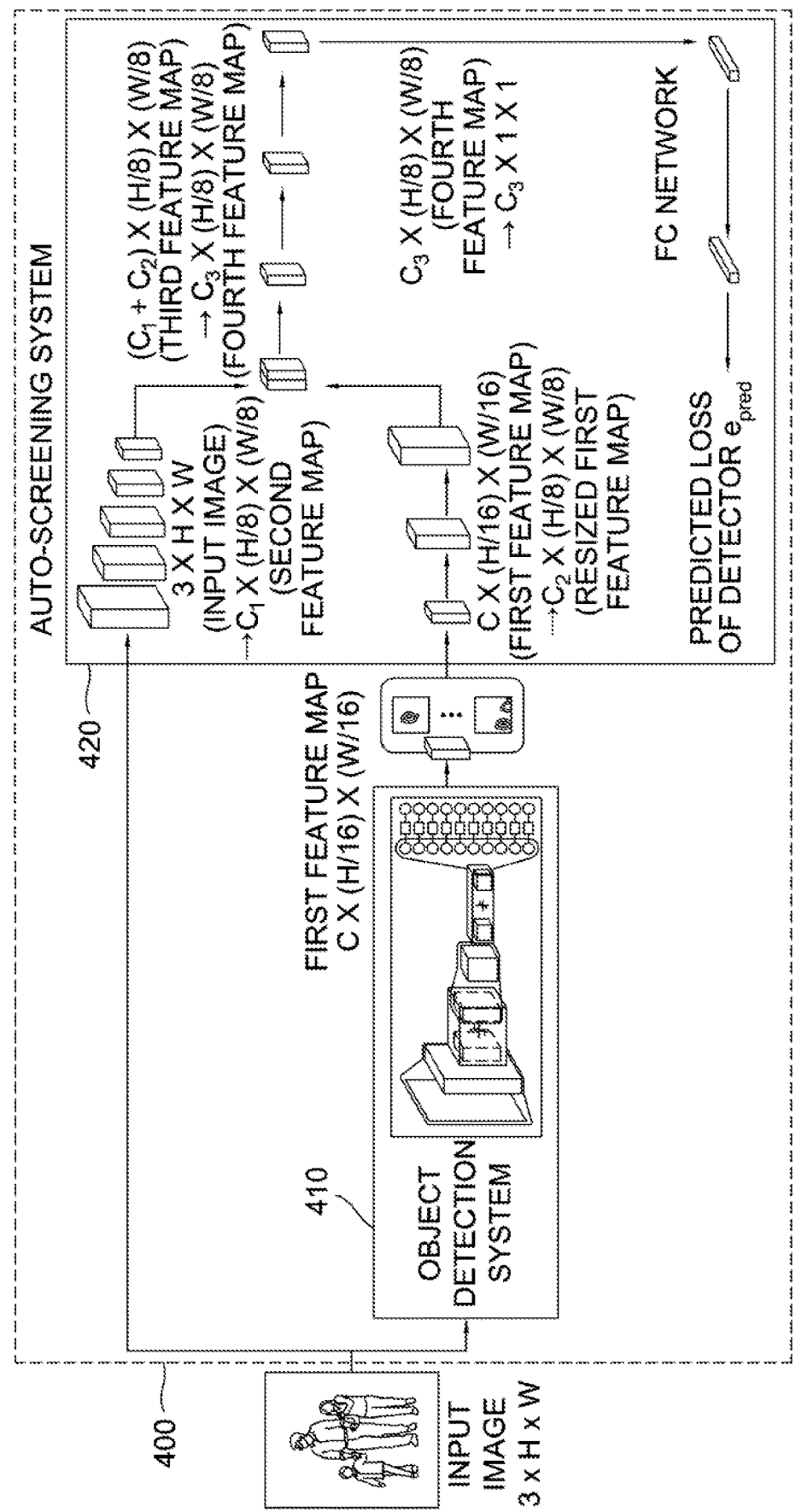
FIG. 5 is a diagram illustrating detailed operations performed by the auto-screening system in accordance with the present invention.

FIG. 4 is a diagram illustrating a method of training an auto-screening system in order to select useful images for training in accordance with the present invention, and FIG. 5 is a diagram illustrating specific operations performed by the auto-screening system in accordance with the present invention.

A convolutional neural network (CNN)-based learning method for selecting useful training data in accordance with the present invention will be described as follows by referring to FIG. 4 and FIG. 5.

A learning device 400 includes a first CNN module 410 for obtaining identification or location information of a specific object within an input image and a second CNN module 420 for auto-screening useful training data to be used for a learning process of the first CNN module 410. Herein, the first CNN module 410 is a module which is a subject to be learned to improve a capability of detecting an object in an actual image, and the second CNN module 420 automatically selects useful training images to be used for learning the first CNN module 410. The second CNN module 420 may also be referred to as the auto-screening system.

In an example embodiment of the present invention, the first CNN module 410 may be used for one of an object detection system for detecting a size and a location of a specific object, a classification system for identifying a type of the specific object, and a segmentation system for distinguishing an area corresponding to the specific object from other areas. In FIGS. 4 and 5, the object detection system is provided as an example. The second CNN module 420 is the auto-screening system for automatically selecting input images including one or more objects which have low possibilities of being correctly detected. Herein, whether the input images have the low possibilities of being correctly detected are determined by referring to information on whether the possibilities are less than a predetermined threshold.

Namely, in accordance with the present invention, one or more parameters of the second CNN module 420 are optimized in order to select useful images to be used for the learning process of the first CNN module 410 among all training image candidates through the learning process of the second CNN module 420 before the learning process of the first CNN module 410 is performed. Thereafter, when the parameters of the second CNN module 420 are optimized, a testing device 600 of FIG. 6 selects useful data to be used for the learning process of the first CNN module 410 by using the optimized second CNN module 420 and the first CNN module 410. Herein, the training image candidates do not have their corresponding ground truths (GTs). After selecting the useful images among the training image candidates, GTs are generated for only the useful images to be used for the learning process of the first CNN module 410. Namely, one or more people may generate the GTs for only the useful images, to thereby establish an image database for training. Then the learning process of the first CNN module 410, i.e., a CNN detector, is performed by using the useful images stored in the image database for training.

During the learning process performed by the learning device 400, it is possible to perform the learning process of the second CNN module 420 only, or it is possible to perform the learning processes of both the second CNN module 420 and the first CNN module 410 at the same time. After the learning process of the second CNN module 420 is completed, then (i) useful images to be used for the learning process of the first CNN module are selected, (ii) the image database is established with the selected useful images, and (iii) the learning process of the first CNN module is performed by using the established image database.

The second CNN module 420 predicts weak points of the first CNN module 410 which currently performs the learning process. Namely, the second CNN module 420 predicts useful photos which are suitable for complementing the weak points of the first CNN module 410, among the training image candidates of which the GTs have not been generated. For example, on condition that a performance of the detector, i.e., the first CNN module 410, is 95% and there are 90,000 photos of which the GTs have not been generated, if a performance of the second CNN module 420, i.e., the probability of the second CNN module 420 correctly determining that each of the training image candidates is useful, is 50% and if the image database for training is established through annotation jobs, i.e., jobs for generating GTs, for 9,000 photos, 4,500 photos among the 9000 photos become the useful images to be used for the learning process of the first CNN module 410. That is, according to a conventional method, in order to establish the image database including the 4,500 useful photos, one or more people should perform the annotation job for 90,000 photos, but in accordance with the present invention, it is possible to establish the image database including the 4,500 useful photos by performing the annotation job for only the 9,000 photos by virtue of the second CNN module 420. In other words, the costs for generating GTs, i.e., the costs for establishing the image database, are reduced to ⅒. In addition, the auto-screening system may be used even when the already-annotated image database is provided. In this case, since the auto-screening system can exclude 95% of the whole data, i.e., 95% of all the training image candidates, which are not useful for the improvement of the performance of the detector, the learning time and the learning costs (electric charges, etc.) may be significantly reduced.

Hereinafter, the learning process will be described by referring to FIG. 4. First of all, in order to learn the auto-screening system, i.e., the second CNN module 420, one or more useful images are arbitrarily selected from the image database, in which GTs for the useful images are prepared, and then fed into the learning device 400. In detail, an input image, i.e., one of the useful training images, is inputted to the first CNN module 410 and the second CNN module 420, respectively. If the first CNN module 410 is the detector as illustrated in FIG. 4, the first CNN module 410 applies one or more predetermined convolution operations to the input image to thereby generate a first feature map. The feature map is generated in the first CNN module 410 through one or more convolution operations, one or more non-linear operations such as ReLU, etc. for image detection. For example, in the example of FIG. 5, if the input image inputted to the learning device 400 has a size of 3×H×X W (here, "3" denotes the number of channels of the image, "H" denotes the height of the image, and "W" denotes the width of the image), the first feature map comes to have a size of C×(H/16)×(W/16), which means that the lengths of the height and the width are reduced to ¹⁄₁₆, and the number of channels increases to "C".

Furthermore, the first CNN module 410 calculates a first output value indicating identification information or location information of a specific object through deconvolution operation or fully connected (FC) operation based on the first feature map. Herein, the first output value may be one of an object detection value, a classification value and a segmentation value, but in the present invention, the object detection value is considered as an example.

Further, the first CNN module 410 calculates a first loss, i.e., an actual loss $e_{true}$, by referring to the first output value and its corresponding GT value. For example, the first loss is calculated by referring to the result, i.e., the first output value, of detecting a specific object by the first CNN module 410 and the GT value.

On the other hand, the second CNN module 420 applies one or more predetermined convolution operations to the input image inputted to the first CNN module 410 to thereby generate a second feature map. The input image inputted to the second CNN module 420 is same as the input image inputted to the first CNN module 410. The convolution operation performed by the second CNN module 420 may be similar to that of the convolution operation performed by the first CNN module 410, but parameters of respective convolution layers or other operation layers may be different. In the example of FIG. 5, if the input image inputted to the learning device 400 has a size of 3×H×W, the size of the second feature map may become $C_1×(H/8)×(W/8)$, which means that the lengths of the height and the width are reduced to ⅛, and the number of channels increases to $c_1$.

Thereafter, the second CNN module 420 integrates the first feature map generated by the first CNN module 410 with the second feature map generated by the second CNN module 420. In the example of FIG. 5, since the size of the first feature map is C×(H/16)×(W/16) and the size of the second feature map is $C_1×(H/8)×(W/8)$, the size of the first feature map is changed to be same as that of the second feature map, then the resized first feature map is integrated with the second feature map to generate a third feature map. Herein, since the size of the second feature map is greater than that of the first feature map, the learning device 400 instructs the second CNN module 420 to increase the size of the first feature map ((H/16)×(W/16)) to be same as that of the second feature map ((H/8)×(W/8)). Herein, the learning device 400 instructs the second CNN module 420 to apply a predetermined number of convolution operations (or deconvolution operations) to the first feature map to thereby change the size of the first feature map. FIG. 5 illustrates the first feature map having the size of C×(H/16)×(W/16), which is inputted to the second CNN module 420, being changed to have the size of $C_2×(H/8)×(W/8)$ through predetermined convolution operations. Further, the second CNN module 420 concatenates the resized first feature map and the second feature map to generate the third feature map. The number of channels of the third feature map becomes $(C_1+C_2)$, the height becomes H/8, and the width becomes W/8.

Thereafter, the second CNN module 420 applies one or more predetermined convolution operations to the third feature map to thereby generate a fourth feature map, then one or more operations are applied to the fourth feature map to thereby generate a second loss, i.e., a predicted loss of detector ($e_{pred}$), corresponding to a prediction value of the first loss. For example, as illustrated in FIG. 5, the fourth feature map having a size of $c_3×(h/8)×(w/8)$ is generated by applying the convolution operations to the third feature map having the size of $(C_1+C_2)×(H/8)×(W/8)$, then a certain feature map having a size of $C_3×1×1$ is generated through an average pooling operation, then the second loss, i.e, the predicted loss of detector ($e_{pred}$), is generated by allowing the certain feature map to pass through the FC network twice.

Thereafter, referring to FIG. 4, the learning device 400 compares the first loss, i.e., the actual loss $e_{true}$, with the second loss, i.e., the predicted loss of detector ($e_{pred}$), to thereby calculate an auto-screener's loss. The auto-screener's loss can be calculated by the formula: $(e_{pred}-e_{true})^2$.

The learning device 400 performs backpropagation by using the calculated auto-screener's loss to thereby optimize the parameters of the second CNN module 420. Herein, the learning device 400 may also perform backpropagation using the first loss calculated by the first CNN module 410 to thereby optimize the parameters of the first CNN module 410.

As described above, since the auto-screener's loss is calculated by referring to the difference between (i) the first loss calculated by referring to the result of detecting the specific object in the input image and the GT value and (ii) the second loss corresponding to the first loss, if the learning device 400 performs the backpropagation in such a manner that minimizes the auto-screener's loss, the second CNN module 420 is learned to output the second loss similar to the first loss. Then it is understood that the second loss outputted from the second CNN module 420 exactly predicts the first loss. Namely, on condition that a certain image is inputted to the second CNN module 420 and its corresponding second loss is large, if the certain image inputted to the first CNN module 410, the first CNN module 410 cannot correctly detect an object in the certain image, and thus the first loss becomes large. On the other hand, on condition that another certain image is inputted to the second CNN module 420 and its corresponding second loss is small, if said another certain image is inputted to the first CNN module 410, the first CNN module 410 is highly likely to correctly detect an object in said another certain image, and thus the first loss becomes small. Herein, if specific images with large second losses are selected among the training image candidates by the second CNN module 420, objects in the specific images are unlikely to be correctly detected when the specific images are inputted to the first CNN module 410, and thus the specific images are selected as useful images to be provided for the learning process of the first CNN module 410.

That is, the detector, i.e., the first CNN module 410, performs learning processes by comparing the detection result outputted by the detector itself with its corresponding GT made by a person, and the auto-screening system learns by using information on how helpful the data predicted by the auto-screening system itself was to the actual learning process of the detector. As such, if the detection result of the detector is very different from its corresponding GT, it may be understood that the auto-screening system has predicted well. Namely, in accordance with the present invention, an adversarial training, which represents that the learning processes are performed while the detector and the auto-screening system compete each other, is used.

Figure 6:
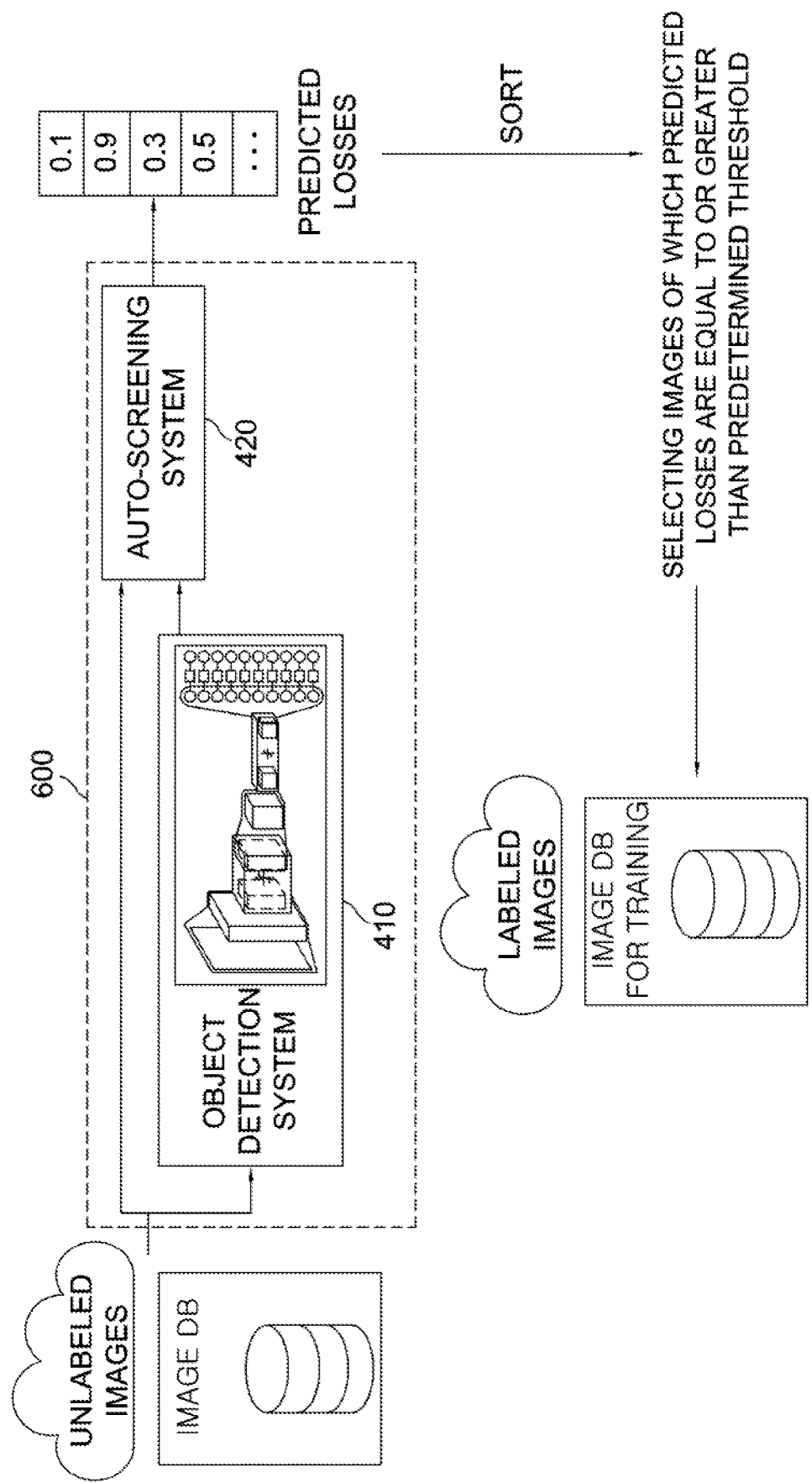
FIG. 6 is a diagram illustrating a method for establishing an image database for training through the auto-screening system in accordance with the present invention.

FIG. 6 is a diagram illustrating a method for establishing an image database for training through the auto-screening system in accordance with the present invention.

Referring to FIG. 6, on condition that the learning process of the second CNN module has been completed through the learning process as shown in FIG. 4 and FIG. 5, if a testing device 600, which uses parameters of the first CNN module 410 and the second CNN module 420, inputs an unlabeled image, i.e., an image for testing, to the first CNN module 410 and the second CNN module 420, the learning device 400 instructs the first CNN module 410 to apply one or more predetermined convolution operations to the test image to thereby obtain a first feature map for testing and instructs the second CNN module 420 to apply one or more predetermined convolution operations to the test image to thereby obtain a second feature map for testing. Then the testing device 600 transmits the first feature map for testing to the second CNN module 420 as another input to thereby allow the second CNN module 420 to change the size of the first feature map for testing to be same as that of the second feature map for testing and then integrate the first feature map for testing with the second feature map for testing to thereby generate a third feature map for testing. Then the testing device 600 instructs the second CNN module 420 to apply one or more predetermined convolution operations to the third feature map for testing to thereby generate a fourth feature map for testing and then apply one or more predetermined operations to the fourth feature map for testing to thereby generate a predicted loss.

If many images for testing are inputted and their corresponding predicted losses are calculated, the testing device 600 selects some images of which the predicted losses are equal to or greater than a predetermined threshold, among the images for testing, as the useful images, i.e., training images to be used for a learning process of the first CNN module 410. Namely, if a predicted loss is equal to or greater than the predetermined threshold, an object in its corresponding input image for testing is unlikely to be correctly detected when the input image for testing is inputted to the first CNN module 410 to thereby determine the input image for testing as useful data to be used for the learning process of the first CNN module 410.

Such selected useful images may be annotated by one or more persons (if the images have already been annotated, they may just be selected), resulting in labeled images to be used for the learning process of the first CNN module 410.

Furthermore, if the parameters of the detector are optimized through the learning process of the detector, an object is detected from an actually inputted test image by using the first CNN module 410 in the testing device which uses the optimized parameters of the detector. For example, classification and detection for at least one object may be performed in a road-driving image.

The present invention has an effect of predicting weak points of the learning device and thereby selecting useful training images for supplementing the weak points.

The present invention has another effect of establishing an effective and useful training image database at a low cost.

The present invention has still another effect of easily improving the performance of the learning device by selecting actually useful image data for training.

The present invention has still yet another effect of significantly reducing learning time and learning cost (electric charges, etc.) because the auto-screening system can exclude 95% data which is not useful for the improvement of the performance of the detector when the already-annotated database is used.

It would be understood by one of ordinary skill in the art that a transmission and/or a reception of the above-described images such as the training image and the test image can be performed by communication units of the learning device and the testing device, and processes of the convolution operation, the deconvolution operation and the loss value operation can be mainly performed by processors of the learning device and the testing device, but the present invention is not limited to these examples.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A convolutional neural network (CNN)-based learning method for selecting useful training data, comprising steps of:
    (a) a learning device, if at least one input image is acquired, (i) instructing a first CNN module capable of obtaining identification information or location information of a specific object in the input image to apply at least one convolution operation to the input image, to thereby generate a first feature map, and (ii) instructing a second CNN module capable of auto-screening useful training data to be used for a learning process of the first CNN module to apply at least one convolution operation to the input image, to thereby generate a second feature map;
    (b) the learning device instructing the first CNN module to generate a first output indicating the identification information or the location information of the specific object by using the first feature map, then calculate a first loss by referring to the first output and its corresponding ground truth (GT);
    (c) the learning device inputting the first feature map to the second CNN module, then instructing the second CNN module to change a size of the first feature map to be same as a size of the second feature map and then integrate the first feature map with the second feature map, to thereby generate a third feature map;
    (d) the learning device instructing the second CNN module to apply at least one convolution operation to the third feature map to generate a fourth feature map, and then to calculate a second loss, as a prediction value of the first loss, by using the fourth feature map;
    (e) the learning device calculating an auto-screener's loss by referring to the first loss and the second loss; and
    (f) the learning device performing backpropagation by using the auto-screener's loss, to thereby optimize at least one parameter of the second CNN module.

2. The CNN-based learning method of claim 1, wherein, at the step of (f), the learning device performs backpropagation by using the first loss, to thereby optimize at least one parameter of the first CNN module.

3. The CNN-based learning method of claim 1, wherein the first CNN module is included in one of an object detection system for detecting a size and a location of the specific object, a classification system for identifying a type of the specific object, and a segmentation system for distinguishing an area corresponding to the specific object from other areas,
    wherein the second CNN module is included in an auto-screening system for automatically selecting at least one specific input image, which respectively includes its corresponding specific object with a low possibility of being correctly detected, among a plurality of input images inputted to the first CNN module,
    wherein the first output represents one of an output of the object detection system, that of the classification system, and that of the segmentation system, and
    wherein the low possibility of being correctly detected is determined by referring to information on whether a possibility is less than a predetermined threshold.

4. The CNN-based learning method of claim 1, wherein the size of the second feature map is greater than the size of the first feature map, and
    wherein, at the step of (c), the learning device instructs the second CNN module to increase the size of the first feature map to be same as the size of the second feature map.

5. The CNN-based learning method of claim 4, wherein, at the step of (c), the learning device instructs the second CNN module to apply a predetermined number of convolution operations to the first feature map, to thereby change the size of the first feature map to be same as the size of the second feature map.

6. The CNN-based learning method of claim 1, wherein, at the step of (c), the learning device instructs the second CNN module to concatenate the first feature map and the second feature map, to thereby generate the third feature map.

7. The CNN-based learning method of claim 1, wherein, at the step of (d), the learning device instructs the second CNN module to allow the fourth feature map to pass through at least one of a pooling layer and a fully-connected (FC) layer, to thereby calculate the second loss.

8. The CNN-based learning method of claim 7, wherein the pooling layer instructs a height and a width of the fourth feature map to become 1.

9. The CNN-based learning method of claim 1, wherein, at the step of (f), the learning device performs backpropagation in such a manner that minimizes the auto-screener's loss.

10. A method for selecting useful training data based on convolutional neural network (CNN), comprising steps of:
    (a) in response to (I) a learning device (i) having instructed a first CNN module capable of obtaining identification information or location information of a specific object in a training image to apply at least one predetermined convolution operation to the training image, to thereby generate a first feature map for training, and (ii) having instructed a second CNN module capable of auto-screening useful training data to be used for a learning process of the first CNN module to apply at least one convolution operation to the training image, to thereby generate a second feature map for training; (II) the learning device having instructed the first CNN module to generate a first output for training indicating the identification information or the location information of the specific object by using the first feature map for training, then calculate a first loss by referring to the first output for training and its corresponding ground truth (GT); (III) the learning device having inputted the first feature map for training to the second CNN module, then having instructed the second CNN module to change a size of the first feature map for training to be same as a size of the second feature map for training and then integrate the first feature map for training with the second feature map for training, to thereby generate a third feature map for training; (IV) the learning device having instructed the second CNN module to apply at least one convolution operation to the third feature map for training to generate a fourth feature map for training, and then to calculate a second loss, as a prediction value of the first loss, by using the fourth feature map; (V) the learning device having calculated an auto-screener's loss by referring to the first loss and the second loss; and (VI) the learning device having performed backpropagation by using the auto-screener's loss, to thereby optimize at least one parameter of the second CNN module, a testing device obtaining each of image candidates as each test image;
(b) the testing device (i) instructing the first CNN module to apply at least one convolution operation to the test image, to thereby generate a first feature map for testing, and (ii) instructing the second CNN module to apply at least one convolution operation to the test image, to thereby generate a second feature map for testing;
(c) the testing device inputting the first feature map for testing to the second CNN module, then instructing the second CNN module to change a size of the first feature map for testing to be same as a size of the second feature map for testing and then integrating the first feature map for testing with the second feature map for testing, to thereby generate a third feature map for testing;
(d) the testing device instructing the second CNN module to apply at least one convolution operation to the third feature map for testing to generate a fourth feature map for testing, and then to calculate a predicted loss by using the fourth feature map for testing; and
(e) the testing device selecting at least one image of which the predicted loss is equal to or greater than a predetermined threshold, among the image candidates, as training images to be used for a learning process of the first CNN module.

11. The method of claim 10, wherein the first CNN module is included in one of an object detection system for detecting a size and a location of the specific object, a classification system for identifying a type of the specific object, and a segmentation system for distinguishing an area corresponding to the specific object from other areas,
wherein the second CNN module is included in an auto-screening system for automatically selecting the training image, which respectively includes its corresponding specific object with a low possibility of being correctly detected, among a plurality of training images inputted to the first CNN module,
wherein the first output for training represents one of an output of the object detection system, that of the classification system, and that of the segmentation system, and
wherein the low possibility of being correctly detected is determined by referring to information on whether a possibility is less than a predetermined threshold.

12. The method of claim 10, wherein the size of the second feature map for training is greater than the size of the first feature map for training, wherein, at the process of (III), the learning device instructs the second CNN module to increase the size of the first feature map for training to be same as the size of the second feature map for training,
wherein the size of the second feature map for testing is greater than the size of the first feature map for testing, and
wherein, at the step of (c), the testing device instructs the second CNN module to increase the size of the first feature map for testing to be same as the size of the second feature map for testing.

13. The method of claim 12, wherein, at the process of (III), the learning device instructs the second CNN module to apply a predetermined number of convolution operations to the first feature map for training, to thereby change the size of the first feature map for training to be same as the size of the second feature map for training, and wherein, at the step of (c), the testing device instructs the second CNN module to apply a predetermined number of convolution operations to the first feature map for testing, to thereby change the size of the first feature map for testing to be same as the size of the second feature map for testing.

14. The method of claim 10, wherein, at the process of (III), the learning device instructs the second CNN module to concatenate the first feature map for training and the second feature map for training, to thereby generate the third feature map for training, and
wherein, at the step of (c), the testing device instructs the second CNN module to concatenate the first feature map for testing and the second feature map for testing, to thereby generate the third feature map for testing.

15. The method of claim 10, wherein, at the process of (IV), the learning device instructs the second CNN module to allow the fourth feature map for training to pass through at least one of a pooling layer and a fully-connected (FC) layer, to thereby calculate the second loss, and
wherein, at the step of (d), the testing device instructs the second CNN module to allow the fourth feature map for testing to pass through at least one of a pooling layer and a fully-connected (FC) layer, to thereby calculate the predicted loss.

16. A learning device for selecting useful training data, comprising:
a processor configured to acquire at least one input image and perform processes of (I) (I-1) instructing a first CNN module capable of obtaining identification information or location information of a specific object in the input image to apply at least one convolution operation to the input image, to thereby generate a first feature map, and (I-2) instructing a second CNN module capable of auto-screening useful training data to be used for a learning process of the first CNN module to apply at least one convolution operation to the input image, to thereby generate a second feature map, (II) instructing the first CNN module to generate a first output indicating the identification information or the location information of the specific object by using the first feature map, then calculate a first loss by referring to the first output and its corresponding ground truth (GT), (III) inputting the first feature map to the second CNN module, then instructing the second CNN module to change a size of the first feature map to be same as a size of the second feature map and then integrate the first feature map with the second feature map, to thereby generate a third feature map, (IV) instructing the second CNN module to apply at least one convolution operation to the third feature map to generate a fourth feature map, and then to calculate a second loss, as a prediction value of the first loss, by using the fourth feature map, (V) calculating an auto-screener's loss by referring to the first loss and the second loss, and (VI) performing backpropagation by using the auto-screener's loss, to thereby optimize at least one parameter of the second CNN module.

17. The learning device of claim 16, wherein, at the process of (VI), the processor performs backpropagation by using the first loss, to thereby optimize at least one parameter of the first CNN module.

18. The learning device of claim 16, wherein the first CNN module is included in one of an object detection system for detecting a size and a location of the specific object, a classification system for identifying a type of the specific object, and a segmentation system for distinguishing an area corresponding to the specific object from other areas,
wherein the second CNN module is included in an auto-screening system for automatically selecting at least one specific input image, which respectively includes its corresponding specific object with a low possibility of being correctly detected, among a plurality of input images inputted to the first CNN module,
wherein the first output represents one of an output of the object detection system, that of the classification system, and that of the segmentation system, and
wherein the low possibility of being correctly detected is determined by referring to information on whether a possibility is less than a predetermined threshold.

19. The learning device of claim 16, wherein the size of the second feature map is greater than the size of the first feature map, and
wherein, at the process of (III), the processor instructs the second CNN module to increase the size of the first feature map to be same as the size of the second feature map.

20. The learning device of claim 19, wherein, at the process of (III), the processor instructs the second CNN module to apply a predetermined number of convolution operations to the first feature map, to thereby change the size of the first feature map to be same as the size of the second feature map.

21. The learning device of claim 16, wherein, at the process of (III), the processor instructs the second CNN module to concatenate the first feature map and the second feature map, to thereby generate the third feature map.

22. The learning device of claim 16, wherein, at the process of (IV), the processor instructs the second CNN module to allow the fourth feature map to pass through at least one of a pooling layer and a fully-connected (FC) layer, to thereby calculate the second loss.

23. The learning device of claim 22, wherein the pooling layer instructs a height and a width of the fourth feature map to become 1.

24. The learning device of claim 16, wherein, at the process of (VI), the processor performs backpropagation in such a manner that minimizes the auto-screener's loss.

25. A testing device for selecting useful training data based on convolutional neural network (CNN), comprising:
an interface that receives each of image candidates as each test image, in response to (i) a learning device (i-1) having instructed a first CNN module capable of obtaining identification information or location information of a specific object in a training image to apply at least one predetermined convolution operation to the training image, to thereby generate a first feature map for training, and (i-2) having instructed a second CNN module capable of auto- screening useful training data to be used for a learning process of the first CNN module to apply at least one convolution operation to the training image, to thereby generate a second feature map for training; (ii) the learning device having instructed the first CNN module to generate a first output for training indicating the identification information or the location information of the specific object by using the first feature map for training, then calculate a first loss by referring to the first output for training and its corresponding ground truth (GT); (iii) the learning device having inputted the first feature map for training to the second CNN module, then having instructed the second CNN module to change a size of the first feature map for training to be same as a size of the second feature map for training and then integrate the first feature map for training with the second feature map for training, to thereby generate a third feature map for training; (iv) the learning device has having instructed the second CNN module to apply at least one convolution operation to the third feature map for training to generate a fourth feature map for training, and then to calculate a second loss, as a prediction value of the first loss, by using the fourth feature map; (v) the learning device having calculated an auto-screener's loss by referring to the first loss and the second loss; and (vi) the learning device having performed backpropagation by using the auto-screener's loss, to thereby optimize at least one parameter of the second CNN module; and
a processor for performing processes of (I) (I-1) instructing the first CNN module to apply at least one convolution operation to the test image, to thereby generate a first feature map for testing, and (I-2) instructing the second CNN module to apply at least one convolution operation to the test image, to thereby generate a second feature map for testing, (II) inputting the first feature map for testing to the second CNN module, then instructing the second CNN module to change a size of the first feature map for testing to be same as a size of the second feature map for testing and then integrating the first feature map for testing with the second feature map for testing, to thereby generate a third feature map for testing, (III) instructing the second CNN module to apply at least one convolution operation to the third feature map for testing to generate a fourth feature map for testing, and then to calculate a predicted loss by using the fourth feature map for testing, and (IV) selecting at least one image of which the predicted loss is equal to or greater than a predetermined threshold, among the image candidates, as training images to be used for a learning process of the first CNN module.

26. The testing device of claim 25, wherein the first CNN module is included in one of an object detection system for detecting a size and a location of the specific object, a classification system for identifying a type of the specific object, and a segmentation system for distinguishing an area corresponding to the specific object from other areas,
wherein the second CNN module is included in an auto-screening system for automatically selecting the training image, which respectively includes its corresponding specific object with a low possibility of being correctly detected, among a plurality of training images inputted to the first CNN module,
wherein the first output for training represents one of an output of the object detection system, that of the classification system, and that of the segmentation system, and
wherein the low possibility of being correctly detected is determined by referring to information on whether a possibility is less than a predetermined threshold.

27. The testing device of claim 25, wherein the size of the second feature map for training is greater than the size of the first feature map for training,
wherein, at the process of (iii), the learning device instructs the second CNN module to increase the size of the first feature map for training to be same as the size of the second feature map for training,
wherein the size of the second feature map for testing is greater than the size of the first feature map for testing, and wherein, at the process of (II), the processor instructs the second CNN module to increase the size of the first feature map for testing to be same as the size of the second feature map for testing.

28. The testing device of claim 27, wherein, at the process of (iii), the learning device instructs the second CNN module to apply a predetermined number of convolution operations to the first feature map for training, to thereby change the size of the first feature map for training to be same as the size of the second feature map for training, and wherein, at the process of (II), the processor instructs the second CNN module to apply a predetermined number of convolution operations to the first feature map for testing, to thereby change the size of the first feature map for testing to be same as the size of the second feature map for testing.

29. The testing device of claim 25, wherein, at the process of (iii), the learning device instructs the second CNN module to concatenate the first feature map for training and the second feature map for training, to thereby generate the third feature map for training, and wherein, at the process of (II), the processor instructs the second CNN module to concatenate the first feature map for testing and the second feature map for testing, to thereby generate the third feature map for testing.

30. The testing device of claim 25, wherein, at the process of (iv), the learning device instructs the second CNN module to allow the fourth feature map for training to pass through at least one of a pooling layer and a fully-connected (FC) layer, to thereby calculate the second loss, and wherein, at the process of (III), the processor instructs the second CNN module to allow the fourth feature map for testing to pass through at least one of a pooling layer and a fully-connected (FC) layer, to thereby calculate the predicted loss.

* * * * *